United States Patent
Coiro, Sr. et al.

(10) Patent No.: US 6,357,393 B1
(45) Date of Patent: Mar. 19, 2002

(54) DEVICE FOR AUTOMATICALLY CONTROLLING EXHAUST FLOW TO A RACK FOR ANIMAL CAGES

(75) Inventors: Michael A. Coiro, Sr., Jacobstown; Frank J. Herdt, Bordentown; Brian M. Bilecki, Trenton, all of NJ (US)

(73) Assignee: Allentown Caging Equipment Co., Inc., Allentown, NJ (US)

(*) Notice: Subject to any disclaimer, the term of this patent is extended or adjusted under 35 U.S.C. 154(b) by 0 days.

(21) Appl. No.: 09/605,449

(22) Filed: Jun. 28, 2000

(51) Int. Cl.[7] ................................................ A01K 1/03
(52) U.S. Cl. ...................................... 119/419; 119/457
(58) Field of Search ................................ 119/457, 418, 119/416, 419

(56) References Cited

U.S. PATENT DOCUMENTS

| | | | |
|---|---|---|---|
| 3,557,756 A | * 1/1971 | Ramsey | 119/419 |
| 4,249,482 A | 2/1981 | Harr | 119/418 |
| 4,343,261 A | 8/1982 | Thomas | 119/418 |
| 4,365,590 A | 12/1982 | Ruggieri et al. | 119/418 |
| 4,402,280 A | 9/1983 | Thomas | 119/418 |
| 4,528,941 A | 7/1985 | Spengler | 119/418 |
| RE32,113 E | * 4/1986 | Harr | 119/419 |
| 4,690,100 A | 9/1987 | Thomas | 119/419 |
| 4,989,545 A | * 2/1991 | Sheaffer et al. | 119/419 |
| 5,000,120 A | 3/1991 | Coiro, Sr. et al. | 119/61 |
| 5,048,459 A | 9/1991 | Niki et al. | 119/418 |
| 5,148,766 A | * 9/1992 | Coiro, Sr. et al. | 119/419 |
| 5,307,757 A | 5/1994 | Coiro, Sr. et al. | 119/418 |
| 5,513,596 A | 5/1996 | Coiro, Sr. et al. | 119/457 |

FOREIGN PATENT DOCUMENTS

FR 2579729 * 3/1985 ................ 119/419

* cited by examiner

Primary Examiner—Charles T. Jordan
Assistant Examiner—Judith A. Nelson
(74) Attorney, Agent, or Firm—Mathews, Collins, Shepherd & Gould, P.A.

(57) ABSTRACT

The present invention relates to a device for automatically controlling exhaust flow to a ventilated rack of animal cages when an air inlet system, such as an air supply blower, to the rack is not operating. Accordingly, the device can be used in a system that assures that the ventilation system is balanced when one or more of the ventilated racks are removed from their respective air supplies. The device includes a damper housing that is adapted to be connected between an exhaust outlet of the ventilated rack and an exhaust system. A movable damper is positioned within the damper housing and is moveable between an open position and a closed position. In the closed position, the device creates a partial obstruction to air flow in the connection.

15 Claims, 5 Drawing Sheets

DEVICE FOR AUTOMATICALLY CONTROLLING EXHAUST FLOW TO A RACK FOR ANIMAL CAGES

BACKGROUND OF THE INVENTION

1. Field of the Invention

The present invention relates to a device for automatically controlling flow of exhaust air to a ventilated rack for animal cages.

2. Related Art

Systems for providing air and removing exhaust from racks containing animal cages are known. U.S. Pat. No. 5,307,757 describes a ventilated animal rack and animal cage system including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released to the atmosphere.

Alternatively, exhaust for a rack of animal cages is removed by a central exhaust system. Several racks can be connected to the exhaust system. One end of an exhaust drop is connected to a duct of the exhaust system for removing exhaust. The other end of the drop is connected to an exhaust plenum of the rack of animal cages. The exhaust operates by negative pressure. Air is supplied to the ventilated rack with a rack mounted supply blower. This system has the disadvantage that if the supply blower malfunctions or is turned off outside air will be drawn into the rack and cages by the exhaust system. Accordingly, the cages can be contaminated with outside air.

Conventional control valves are used to control laboratory air flow of fume hoods having general exhaust and room supply air. The valves regulate air flow as duct static pressure varies. A pressure independent controller within the control valve adjusts to static pressure. For example, the controller can include a cone biased in a venturi to maintain a set flow. An example of this type of control valve is manufactured as an Accell®II Airflow Control Valve, by Phoenix Controls Corporation, Massachusetts. This type valve has the shortcoming of using a complicated mechanical system, which is expensive to manufacture and can be subject to mechanical failures.

It is desirable to provide a device for automatically controlling exhaust flow to a ventilated rack of animal cages upon the condition of failure or interruption of an air supply blower which provides air to the ventilated rack, thereby assuring a barrier condition of the ventilated rack and preventing imbalance of the compromised rack with other ventilated racks connected to a central exhaust system.

SUMMARY OF THE INVENTION

The present invention relates to a device for automatically controlling exhaust flow to a ventilated rack of animal cages when an air inlet system, such as an air supply blower, to the rack is not operating. Accordingly, the device assures that the exhaust system is balanced when air supply to the ventilated rack is compromised. The device creates a partial obstruction to air flow in the exhaust connection, thereby preventing flow of exhaust to the rack and assuring a barrier condition of the rack.

The device includes a damper housing that is adapted to be connected between an exhaust outlet of the ventilated rack and an exhaust system. A movable damper is positioned within the damper housing. A linear actuator is activated to move the damper into an open position when the air inlet system is fully operating. The damper reverts to a partially closed position when a failure of the air inlet system is detected.

An air inlet interface internal in the air inlet system detect the operating condition of the air inlet system. The air inlet interface provides a signal indicating that the air inlet system is operating and proper air supply is provided to the rack. When the air inlet interface detects an alarm condition, such as a loaded filter, power failure or blower malfunction, the air inlet interface provides a signal indicating that the air inlet system is not operating. An auto damper interface receives the signals for the air inlet interface. The auto damper interface provides an electrical connection to the linear actuator upon receiving the signal indicating that the air inlet system is operating for moving the damper into an open position. The auto damper interface deactivates the linear actuator upon not receiving the signal indicating that the air inlet system is operating and thus moves the damper into a partially closed position.

The invention will be more fully described by reference to the following drawings.

DETAILED DESCRIPTION

Figure 1A:
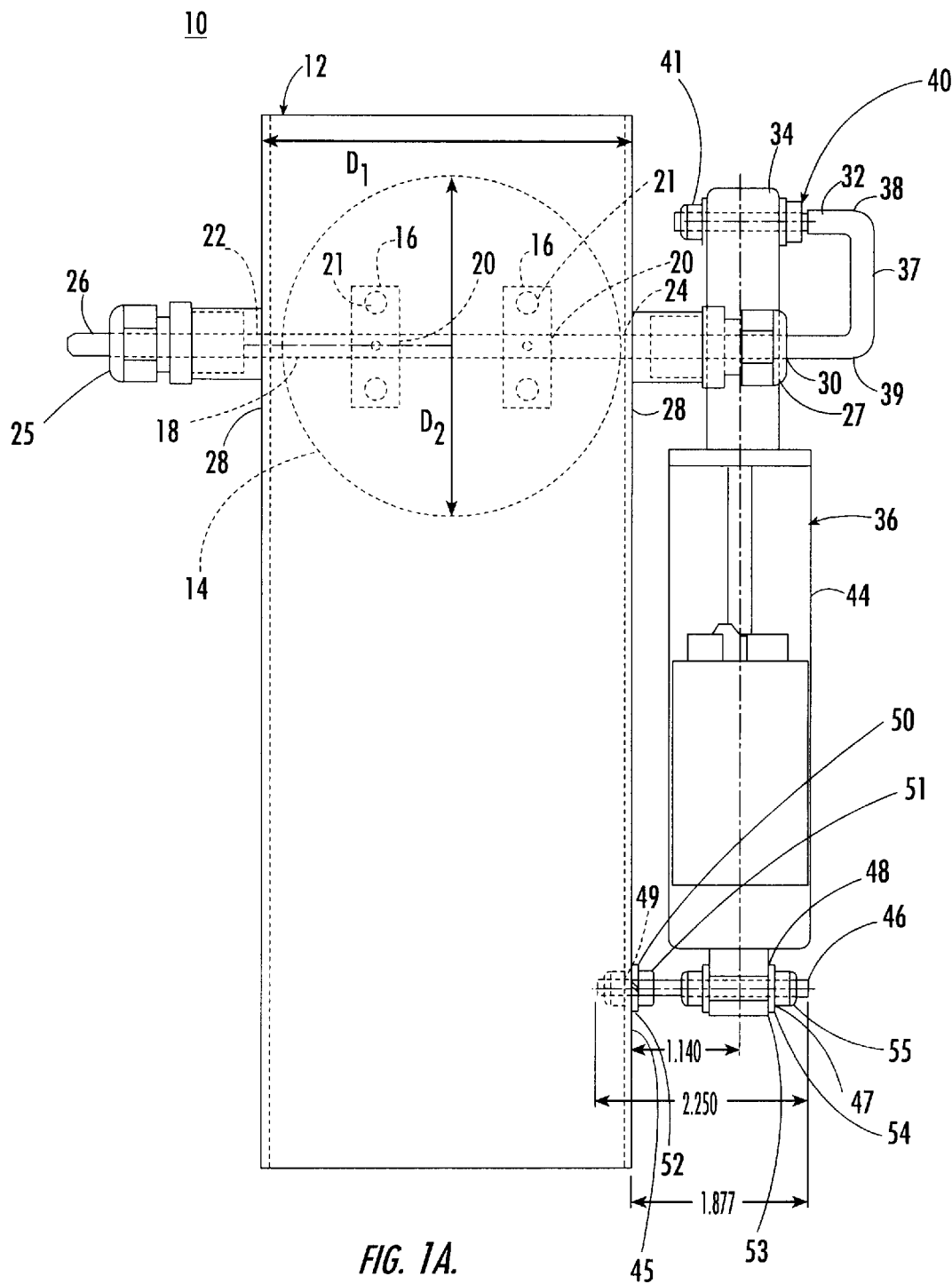
FIG. 1A is a side sectional view of a device for automatically controlling exhaust flow in the open position in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1B:
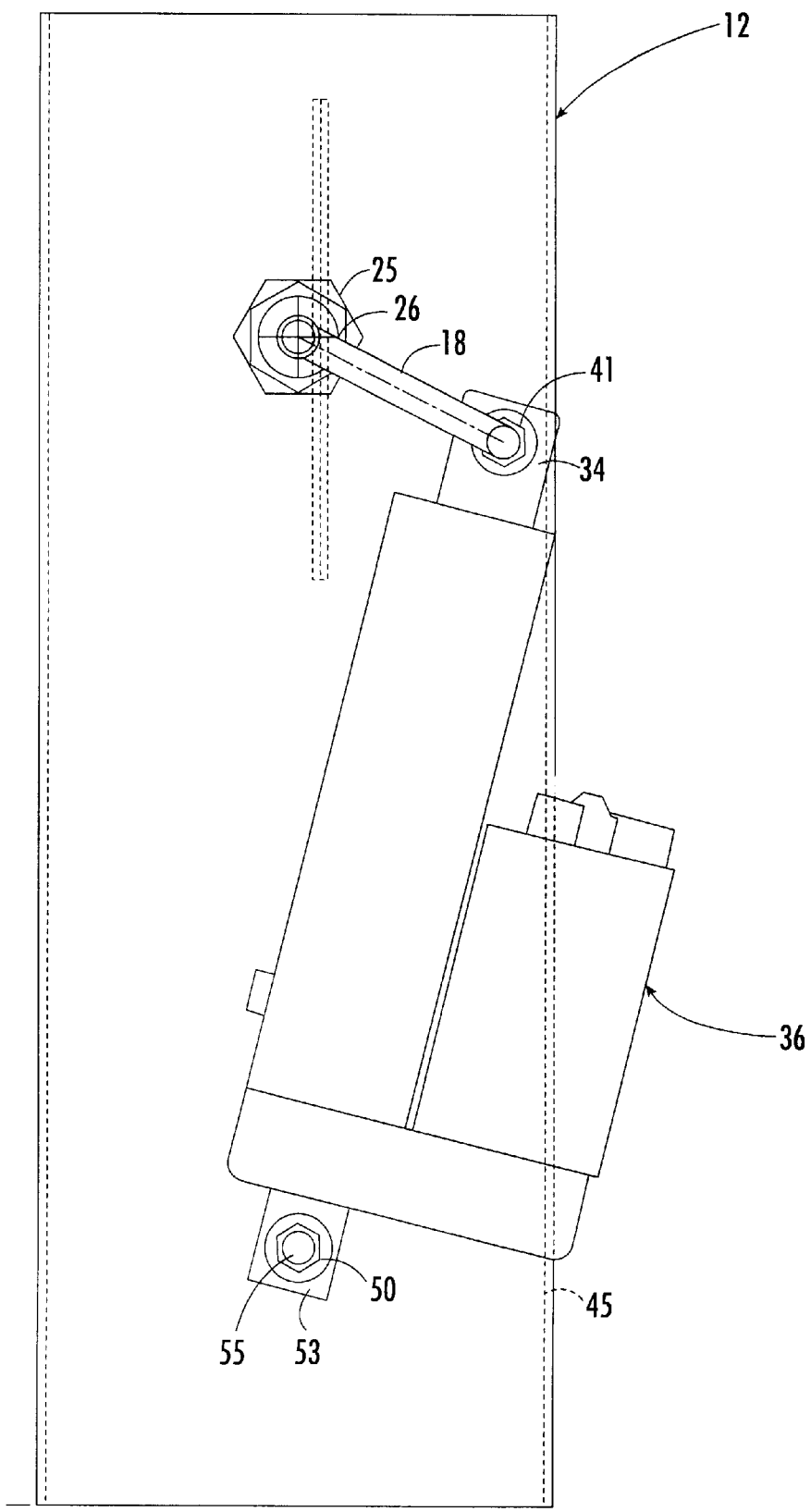
FIG. 1B is a front elevational view of the device.

FIGS. 1A–1B illustrate a device for automatically controlling exhaust flow 10 in accordance with the teachings of the present invention. Damper housing 12 is formed of a hollow tube. For example, damper housing 12 can be formed of a stainless steel tube having a diameter in the range of about 3 inches to about 4 inches and damper panel 14 can have a circular shape. Damper panel 14 is positioned within inner diameter $D_1$ of damper housing. Damper panel 14 has an outer diameter $D_2$ which is smaller than inner diameter $D_1$ of damper housing. For example, outer diameter $D_2$ can have a diameter which is about 75 to about 95%, preferably about 90%, of diameter $D_1$ in order to provide a static pressure of exhaust when damper panel 14 is in the closed position, as described below.

Bracket 16 couples damper panel 14 to damper control rod 18. Bracket 16 includes a raised middle section 20 for receiving damper control rod 18. Screws 21 can be used for connecting bracket 16 to damper control rod 18.

Damper control rod 18 extends through aperture 22 and aperture 24 in damper housing 12. Fitting 25 couples end 26 of damper control rod 18 to outside surface 28 of damper housing 12. Fitting 27 couples middle portion 30 of damper control rod 18 to outside surface 28 of damper housing 12. End 32 of damper control rod 18 is coupled to actuator shaft 34 of linear actuator 36. For example, end 32 can have an integral "u" shape formed of middle portion 37, leg portion 38 and leg portion 39. Leg portion 38 is coupled to actuator shaft 34 and leg portion 39 is coupled to damper housing 12. Weld nut 40 and hex nut 41 couple leg portion 38 to actuator shaft 34.

Linear actuator 36 extends and retracts actuator shaft 34 from linear actuator housing 44 for opening and closing damper panel 14. Linear actuator 36 is coupled to end 45 of damper housing 12. Threaded rod 46 extends through aperture 47 in end 48 of shaft housing 44 and aperture 49 in damper housing 12. Washer 50 is placed between locking nut 51 and surface 52 of end 45 of damper housing 12. For example, locking nut 51 can be a nylon locking nut. A suitable washer 50 is a teflon washer. Washer 54 is placed between outside surface 53 of linear actuator 36 and nut 55.

Figure 2:
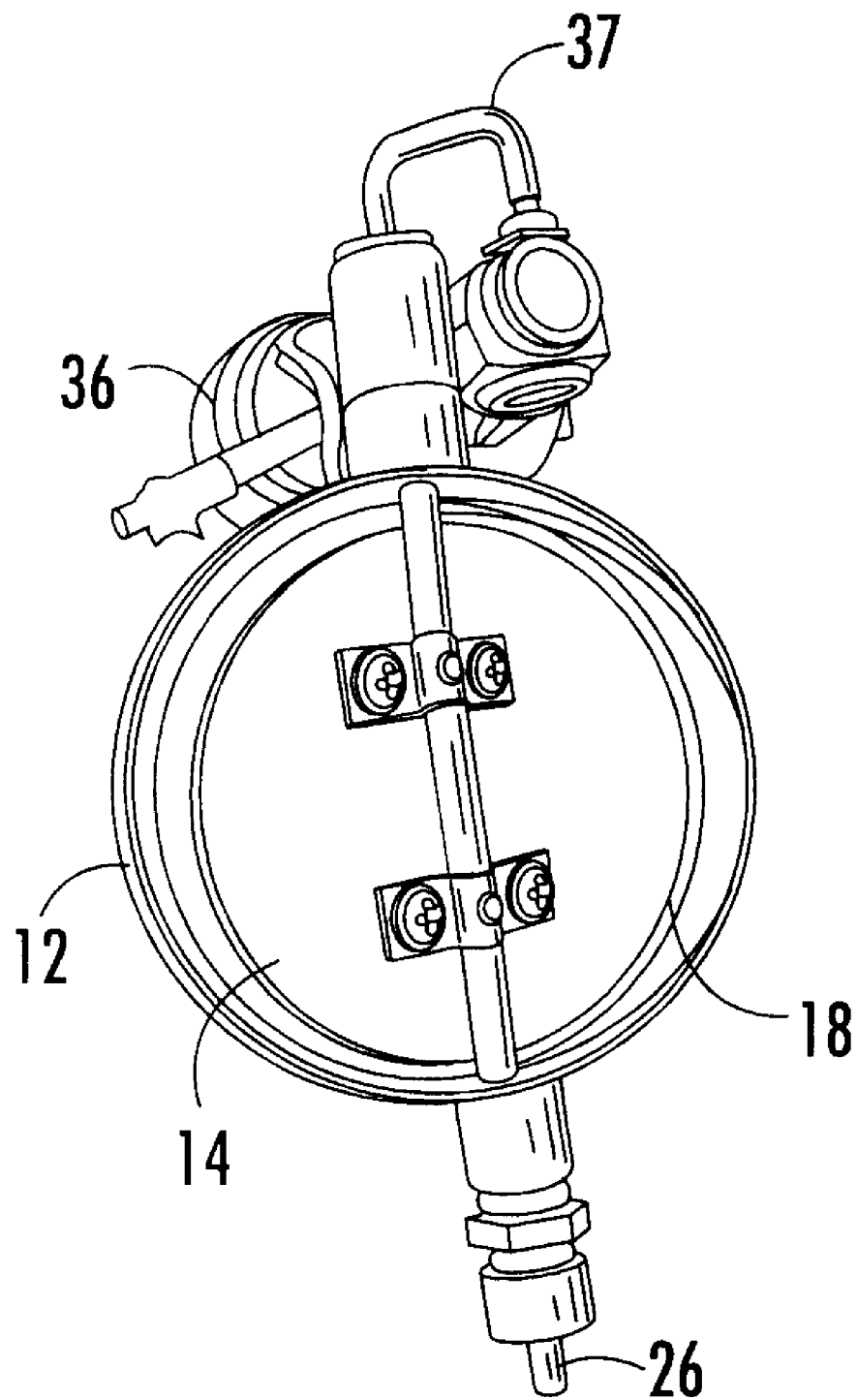
FIG. 2 is a top plan view of the device in a closed position.

Actuator shaft 34 is retracted within linear actuator housing 44 when damper panel 14 is in the open position. In the open position, damper panel 14 is substantially vertically positioned or vertically angulated within damper housing 12. Actuator shaft 34 is extended from linear actuator 36 to rotate damper control rod and move damper panel 14 into the closed position, as shown in FIG. 2. In the closed position damper panel 14 is positioned substantially horizontally within damper housing 12 for obstructing air flow into damper housing 12. Linear actuator 36 provides precision motion of damper panel 14.

Figure 3:
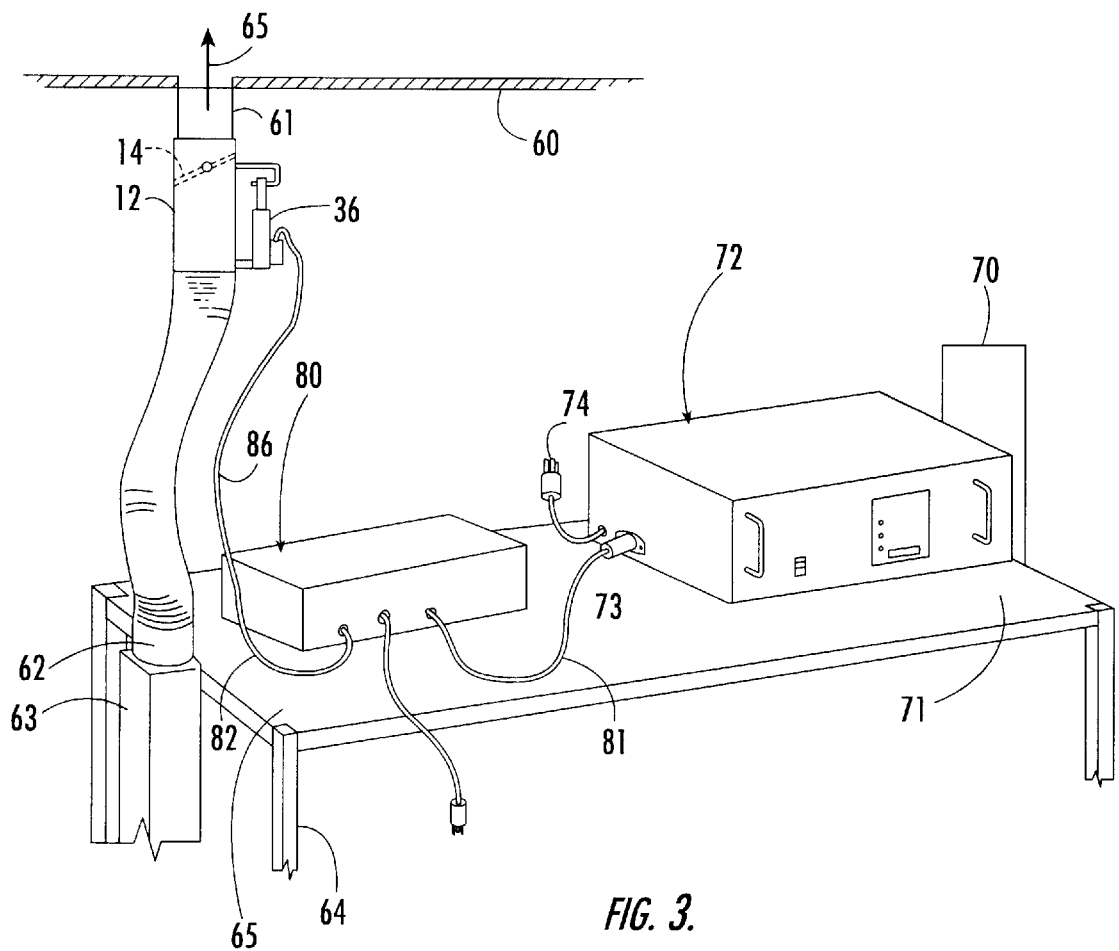
FIG. 3 is a schematic diagram of the device in connection with an exhaust system and a ventilated rack of animal cages.

Damper housing 12 is connected between outlet 61 of exhaust system 60 and exhaust outlet 62, as shown in FIG. 3. Exhaust outlet 62 connects to exhaust plenum 63 of ventilated rack of animal cages 64. Accordingly, damper panel 14 regulates flow of exhaust 65 from exhaust outlet 62 to exhaust system 60. In the partially closed position of damper panel 14, damper panel 14 obstructs exhaust from exhaust system 60 to provide a static pressure in damper housing 12, thereby preventing exhaust from entering outlet 61.

Air inlet system 70 provides air 71 to ventilated rack of animal cages 64. For example, air inlet system 70 can comprise an air supply blower connected to an air inlet plenum of ventilated rack of animal cages 64. Ventilated rack of animal cages 64 can be a conventional ventilated rack of animal cages system such as ventilated rack animal cage systems manufactured by Allentown Caging Equipment Co., Allentown, N.J. as Model No. MS711SR140MVP. Air inlet interface 72 interfaces to air inlet system 70. Air inlet interface 72 detects conditions of air inlet system 70. For example, air inlet interface 72 detects if air inlet system 70 is operating or if air inlet system 70 is in an alarm condition, such as a loaded filter, power failure or blower malfunction, and is not operating. Air inlet interface 72 provides a signal 73 indicating that air inlet system 70 is operating or air inlet system 70 is not operating. Power supply 74 provides power for air inlet interface 72. A suitable air inlet interface 72 is manufactured by McLean Engineering as Smart-Pak SB 4000.

Damper interface 80 is connected over connection 81 to air inlet interface 72. Damper interface 80 is connected over connection 82 to linear actuator 36. Damper interface 80 receives signal 73 over connection 81. Damper interface 80 provides power 86 to activate linear actuator 42 dependent on received signal 73. For example, if signal 73 indicates air inlet system 70 is operating, and damper panel 14 was in the closed position, damper interface 80 generates power 86 over connection 82 to activate linear actuator 36 for opening damper panel 14 into the open position. Alternatively, if no signal 73 is received indicating air inlet system 70 is not operating, and damper panel 14 was in the open position, damper interface 80 deactivates linear actuator 36 for moving damper panel 14 into the closed position. Power supply 87 provides power for damper interface 80. Air inlet interface 72 can be internal in air inlet system 70. Alternatively, air inlet interface 72 and damper interface 80 can be supported by surface 65 of ventilated rack of animal cages 64. Air inlet interface 72 and damper interface 80 can alternatively be mounted to a wall structure.

Figure 4:
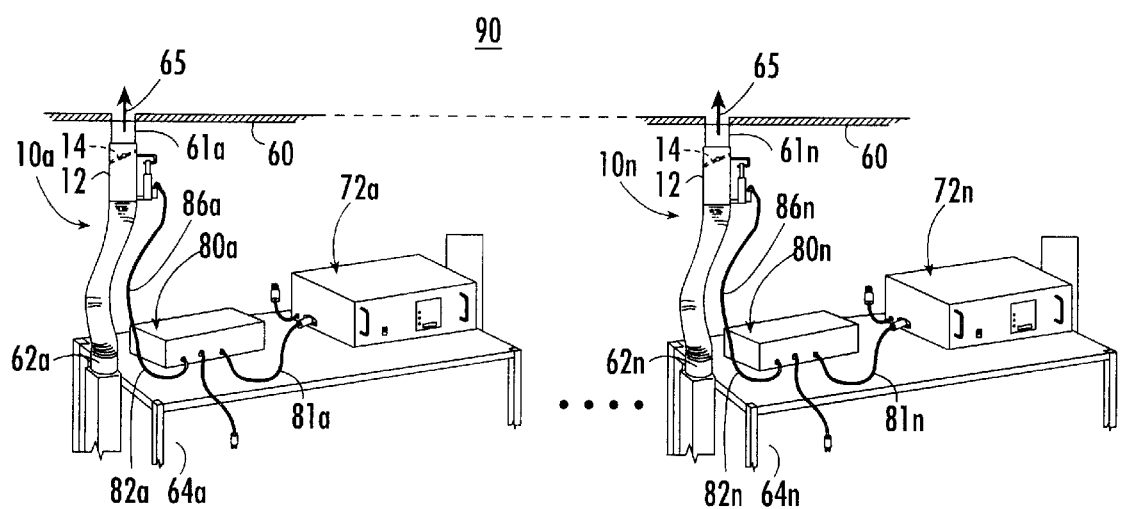
FIG. 4 is a schematic diagram of a system for automatically controlling exhaust flow to at least one ventilated rack of animal cages.

FIG. 4 illustrates a system for automatically controlling exhaust flow to at least one ventilated rack 90 in which at least one device 10a–10n is connected between a respective outlet 61a–n of exhaust system 60 and exhaust outlet 62a–62n of a ventilated rack of animal cages 64a–64n. Respective damper interface 80a–80n is connected over connection 81a–81n to air inlet interface 72a–72n and over connection 82a–82n to linear actuator 36a–36n. It will be appreciated that each of devices 10a–10n can be in an open position or a partially closed position. For example, when device 10a is in the partially closed position device 10a prevents exhaust imbalance to other devices 10b–10n.

It is to be understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

We claim:

1. A device for controlling exhaust flow from an exhaust system to a ventilated rack of animal cages, said ventilated rack having an exhaust outlet and air inlet system, said device comprising:

a damper housing adapted to be connected between said exhaust outlet and said exhaust system;

a movable damper positioned within said damper housing; and actuator means for moving said movable damper being between an open and a closed position, wherein said actuator means moves said movable damper into an open position when the air inlet system is operating and said movable damper is moved into a partially closed position when said air inlet system is not operating and in said closed position said damper obstructs said exhaust flow from flowing to said exhaust outlet of said ventilated rack.

2. The device according to claim 1 wherein said damper housing comprises a hollow tube and said damper is a damper panel having a circular shape.

3. The device according to claim 2 wherein said damper housing has an inner diameter $D_1$, said damper panel has an outer diameter $D_2$ and said outer diameter $D_2$ is about 75% to about 95% of said inner diameter $D_1$.

4. The device according to claim 3 wherein said outer diameter $D_2$ is about 90% of said inner diameter $D_1$.

5. The device according to claim 1 wherein said damper comprises:

a damper panel coupled to a damper control rod, said damper control rod extending through an aperture in said damper housing, said damper control rod adapted to be rotated for moving said damper panel into said open position wherein said damper panel is substantially vertically positioned or vertically angulated within said damper housing and said closed position wherein said damper panel is substantially horizontal within said damper housing.

6. The device according to claim 5 wherein said actuator means comprises a linear actuator coupled to an actuator shaft, said linear actuator extending and retracting said actuator shaft, said actuator shaft being coupled to said damper control rod.

7. The device according to claim 6 further comprising:

a damper interface electrically connected to said linear actuator, said damper interface adapted to receive a signal from an air inlet interface, said signal including information indicating either that the air inlet system is operating or that the air inlet system is not operating, the damper interface activating the linear actuator upon receiving the signal indicating that the air inlet system is operating for moving the damper panel into the open position and the damper interface deactivating the linear actuator upon receiving the signal indicating that the air inlet system is not operating for moving the damper panel into the closed position.

8. A system for controlling exhaust flow to at least one ventilated rack of animal cages having an exhaust outlet, said system comprising:

an exhaust system for removing the exhaust from said at least one ventilated rack;

at least one damper housing connected to said exhaust system;

a movable damper positioned within said damper housing;

actuator means for moving said movable damper being between an open and a closed position; and at least one air inlet system supplying air to said at least one ventilated rack, wherein said actuator means moves said movable damper into an open position when the air inlet system is operating and said movable damper is moved into a closed position when said air inlet system is not operating and in said closed position said damper obstructs said exhaust flow from flowing to said exhaust outlet of said ventilated rack from said exhaust system.

9. The system of claim 8 wherein said damper comprises:

a damper panel coupled to a damper control rod, said damper control rod extending through an aperture in said damper housing, said damper control rod adapted to be rotated for moving said damper panel into said open position wherein said damper panel is substantially vertically positioned or vertically angulated within said damper housing and said closed position wherein said damper panel is substantially horizontal within said damper housing.

10. The system of claim 9 wherein said actuator means comprises a linear actuator coupled to an actuator shaft, said linear actuator extending and retracting said actuator shaft, said actuator shaft being coupled to said damper control rod.

11. The system of claim 10 further comprising:

an air inlet interface providing a signal including information indicating either that the air inlet system is operating or that the air inlet system is not operating.

12. The system of claim 11 further comprising:

a damper interface receiving said signal from said air inlet interface, the damper interface activating the linear actuator upon receiving the signal indicating that the air inlet system is operating for moving the damper panel into the open position and the damper interface deactivating the linear actuator upon not receiving the signal indicating that the air inlet system is operating for moving the damper panel into the closed position.

13. The system of claim 8 wherein said damper housing comprises a hollow tube and said damper is a damper panel having a circular shape.

14. The system of claim 13 wherein said damper housing has an inner diameter $D_1$, said damper panel has an outer diameter $D_2$ and said outer diameter $D_2$ is about 75% to 95% of said inner diameter $D_1$.

15. The system of claim 14 wherein said outer diameter $D_2$ is about 90% of said inner diameter $D_1$.

* * * * *